(12) United States Patent
Lin et al.

(10) Patent No.: US 10,649,632 B2
(45) Date of Patent: May 12, 2020

(54) METHOD AND APPARATUS FOR PAGE DIFFERENCE PRESENTATION

(71) Applicants: China Mobile Group Zhejiang Co., Ltd., Zhejiang (CN); Migu Digital Media Co., Ltd., Zhejiang (CN)

(72) Inventors: Xu Lin, Zhejiang (CN); Li Jiang, Zhejiang (CN); Hezhong Dai, Zhejiang (CN); Xue Chen, Zhejiang (CN); Linlin Bao, Zhejiang (CN); Yanlong Yang, Zhejiang (CN)

(73) Assignee: China Mobile Group Zhejiang Co., Ltd., Zhejiang (CN)

( * ) Notice: Subject to any disclaimer, the term of this patent is extended or adjusted under 35 U.S.C. 154(b) by 155 days.

(21) Appl. No.: 15/561,319

(22) PCT Filed: Dec. 28, 2015

(86) PCT No.: PCT/CN2015/099115
§ 371 (c)(1),
(2) Date: Sep. 25, 2017

(87) PCT Pub. No.: WO2016/150219
PCT Pub. Date: Sep. 29, 2016

(65) Prior Publication Data
US 2018/0101285 A1    Apr. 12, 2018

(30) Foreign Application Priority Data

Mar. 26, 2015    (CN) .......................... 2015 1 0137024

(51) Int. Cl.
*G06F 3/0483*    (2013.01)
*G06F 16/93*    (2019.01)
(Continued)

(52) U.S. Cl.
CPC ............ *G06F 3/0483* (2013.01); *G06F 3/016* (2013.01); *G06F 3/04883* (2013.01);
(Continued)

(58) Field of Classification Search
CPC .......................... G06F 3/0483; G06F 3/04883
See application file for complete search history.

(56) References Cited

U.S. PATENT DOCUMENTS

| | | | |
|---|---|---|---|
| 2003/0210226 A1* | 11/2003 | Ho .................. | G06F 3/0483 345/156 |
| 2012/0005617 A1* | 1/2012 | Lee .................. | G06F 3/0483 715/776 |
| 2013/0104017 A1* | 4/2013 | Ko .................. | G06F 3/0483 715/205 |

FOREIGN PATENT DOCUMENTS

| | | |
|---|---|---|
| CN | 101576804 A | 11/2009 |
| CN | 101986247 A | 3/2011 |

(Continued)

OTHER PUBLICATIONS

International Search Report dated Mar. 24, 2016 (English version), issued in International Application No. PCT/CN2015/099115 (6 pages).

(Continued)

*Primary Examiner* — Scott T Baderman
*Assistant Examiner* — Seung Woon Jung
(74) *Attorney, Agent, or Firm* — Arch & Lake LLP

(57) ABSTRACT

A method and an apparatus for differentially presenting a page are provided, and the method includes: acquiring a page new-old parameter of a page to be presented, and presenting the page based on the page new-old parameter, collecting operation information of the page, and updating the page new-old parameter based on the operation information.

8 Claims, 3 Drawing Sheets

(51) Int. Cl.
*G06F 16/23* (2019.01)
*G06F 3/01* (2006.01)
*G06F 3/0488* (2013.01)
*G06T 11/00* (2006.01)

(52) U.S. Cl.
CPC .......... *G06F 16/2379* (2019.01); *G06F 16/93* (2019.01); *G06T 11/001* (2013.01); *G06T 2200/24* (2013.01)

(56) References Cited

FOREIGN PATENT DOCUMENTS

| | | |
|---|---|---|
| CN | 102801850 A | 11/2012 |
| CN | 103197876 A | 7/2013 |
| CN | 103455770 A | 12/2013 |

OTHER PUBLICATIONS

Chinese Office Action (including English translation) issued in corresponding CN Patent Application No. 201510137024.6, dated Nov. 28, 2018, 12 pages.

\* cited by examiner

METHOD AND APPARATUS FOR PAGE DIFFERENCE PRESENTATION

CROSS-REFERENCE TO RELATED APPLICATION

The present application is the U.S. national phase application of PCT Application No. PCT/CN2015/099115 filed on Dec. 28, 2015, which claims a priority of the Chinese Patent Application No. 201510137024.6 filed in China on Mar. 26, 2015, both of which are incorporated herein by reference in their entirety.

TECHNICAL FIELD

The present disclosure relates to a technology of page display, and in particular, to a method and an apparatus for differentially reference a page.

BACKGROUND

Experience on electronic readers is increasingly closer to that on paper books nowadays, and electronic books (e-books) may be expected to replace paper books and newspapers in a large scale in future. It has been an important project to make the e-books not inferior to the paper books in aspects of emotion and experience in future. To this end, many new technical breakthroughs on the e-books have been achieved, such as simulating page-turning effects, stimulating paper characteristics textures, providing dynamic interaction effects on opening a title page, adding bookmarks, or the like.

The simulating paper characteristics textures is a simple simulation mode, in which several different textures needs to be stored at a back-end and a user may be allowed to select one of the textures according to his or her hobbies when reading.

A haptic interaction has become a most recent technology in a field of human-computer interaction, and will have a profound impact on information exchange and communication of people. A force-haptic reproduction system for image textures based on a force-haptic interaction device has emerged and been popular. When a virtual agent of the force-haptic interaction device in a virtual environment glides across a texture surface of a virtual object, a height of a virtual object corresponding to a contact point at the texture surface and a coefficient of kinetic friction reflecting roughness of the contact point are obtained firstly by means of an image-processing method, and then a force model of continuous normal contact forces reflecting a concavo-convex degree of the contact point and a tangential friction model reflecting the roughness of the contact point are established, respectively, and finally a texture contact force is fed back to an operator in real time through the force-haptic interaction device, so as to implement force-haptic expression and representation when a figure of the operator glides across the texture surface of the virtual object. The continuously-changed normal forces that are fed back not only enables the human-computer interaction to be more real, but also makes an interaction system more stable, and the fed friction related to the roughness of the contact point further improves a sense of reality for reproducing texture.

However, the above solution of simulating textures has the following drawbacks: only limited amount of textures may be selected passively, and no emotional feedback may be made by the textures according to different user operations.

The above solution of haptic interaction has the following drawbacks: an interaction feedback may be made only at the time of a body contact between the user and an interactive device and only at the moment when the body contact is being made.

SUMMARY

(I) Technical Problems to be Solved

The present disclosure mainly provides a method and an apparatus for differentially presenting a page so as to improve the human-computer interaction effectiveness for pages.

(II) Technical Solutions

In order to achieve the above-mentioned objectives, the present disclosure provides the following technical solutions.

A method for differentially presenting a page is provided in the present disclosure, and the method includes: acquiring a page new-old parameter of a page to be presented; presenting the page based on the page new-old parameter; and collecting operation information of the page, and updating the page new-old parameter based on the operation information.

In the above technical solutions, the page new-old parameter includes: a page new-old index, and/or a touch direction index, and/or a touch strength level.

In the above technical solutions, the acquiring a page new-old parameter of a page to be presented and the presenting the page based on the page new-old parameter include: reading page data by a client device, the page data including page-turning record information and the page-turning record information including a page number, and the page new-old parameter corresponding to the page number; searching, by the client device, the page new-old parameter corresponding to the page number of the page to be presented in the page-turning record information by the client device based on the page number of the page to be presented, and calling or superimposing, by the client device, a background image corresponding to the page via the page new-old parameter so as to present the page.

In the above technical solutions, the page new-old parameter is a new-old parameter of the entirety of the page, or a new-old parameter of each of N regions divided from the page.

In the above technical solutions, the collecting operation information of the page and updating the page new-old parameter based on the operation information, includes: collecting a page-turning operation of a user on the page, calculating page-turning times of the page, finding a page new-old index corresponding to the page-turning times of the page in a mapping table between page-turning times and page new-old indexes, and updating the page new-old index of the page, by the client device; or collecting the page-turning operation and a touch region of the user on the page, calculating page-turning times generated through the touch region, finding the page new-old index corresponding to the page-turning times generated through the touch region in the mapping table between page-turning times and page new-old indexes, and updating a new-old index of the touch region of the page, by the client device; or, collecting a sliding direction of the page-turning operation of the user on the page, finding a touch direction index corresponding to the sliding direction in a mapping table between sliding directions and touch direction indexes, and updating the touch direction index of the page, by the client device; or, collecting the sliding direction and the touch region of the page-turning operation of the user on the page, finding the touch direction index corresponding to sliding directions in the mapping table between sliding directions and touch direction indexes, and updating the touch direction index of the touch region of the page, by the client device; or, collecting a touch strength of the page-turning operation of the user on the page, finding a touch strength level corresponding to the touch strength in a mapping table between touch strength and touch strength levels, and updating the touch strength level of the page, by the client device; or, collecting the touch strength and the touch region of the page-turning operation of the user on the page, finding the touch strength level corresponding to the touch strength in the mapping table between touch strength and touch strength levels, and updating the touch strength level of the touch region of the page, by the client device; or, collecting the page-turning operation and the sliding direction of the user on the page, calculating the page-turning times of the page, finding the page new-old index corresponding to the page-turning times of the page in the mapping table between page-turning times and page new-old indexes, and updating the page new-old index of the page; and finding the touch direction index corresponding to the sliding direction in the mapping table between sliding directions and touch direction indexes, and updating the touch direction index of the page, by the client device; or, collecting the page-turning operation, the sliding direction and the touch region of the user on the page, calculating the page-turning times generated through the touch region, finding the page new-old index corresponding to the page-turning times generated through the touch region in the mapping table between page-turning times and page new-old indexes, and updating the new-old index of the touch region of the page; and finding the touch direction index corresponding to the sliding direction in the mapping table between sliding directions and touch direction indexes, and updating the touch direction index of the touch region of the page, by the client device; or, collecting the page-turning operation and the touch strength of the user on the page, calculating the page-turning times of the page, finding the page new-old index corresponding to the page-turning times in the mapping table between page-turning times and page new-old indexes, and updating the page new-old index of the page; and finding the touch strength level corresponding to the touch strength in the mapping table between touch strength and touch strength levels, and updating the touch strength level of the page, by the client device; or, collecting the page-turning operation, the touch strength and the touch region of the user on the page, calculating the page-turning times generated through the touch region, finding the page new-old index corresponding to the page-turning times in the mapping table between page-turning times and page new-old indexes, and updating the new-old index of the touch region of the page; and finding the touch strength level corresponding to the touch strength in the mapping table between touch strength and touch strength levels, and updating the touch strength level of the touch region of the page, by the client device; or, collecting the sliding direction and the touch strength of the page-turning operation of the user on the page, finding the touch direction index corresponding to the sliding direction in the mapping table between sliding directions and touch direction indexes, and updating the touch direction index of the page, finding the touch strength level corresponding to the touch strength in the mapping table between touch strength and touch strength levels, and updating the touch strength level of the page, by the client device; or, collecting the sliding direction, the touch strength and the touch region of the page-turning operation of the user on the page, finding the touch direction index corresponding to the sliding direction in the mapping table between sliding directions and touch direction indexes, and updating the touch direction index of the touch region of the page; and finding the touch strength level corresponding to the touch strength in the mapping table between touch strength and touch strength levels, and updating the touch strength level of the touch region of the page, by the client device; or, collecting the page-turning operation, the sliding direction and the touch strength of the user on the page, calculating the page-turning times of the page, finding the page new-old index corresponding to the page-turning times in the mapping table between page-turning times and page new-old indexes, and updating the page new-old index of the page; finding the touch direction index corresponding to the sliding direction in the mapping table between sliding directions and touch direction indexes, and updating the touch direction index of the page; finding the touch strength level corresponding to the touch strength in the mapping table between touch strength and touch strength levels, and updating the touch strength level of the page, by the client device; or, collecting the page-turning operation, the sliding direction, the touch strength and the touch region of the user on the page, calculating the page-turning times generated through the touch region, finding the page new-old index corresponding to the page-turning times in the mapping table between page-turning times and page new-old indexes, and updating the new-old indexes of the touch region of the page; finding the touch direction index corresponding to the sliding direction in the mapping table between sliding directions and touch direction indexes, and updating the touch direction index of the touch region of the page; and finding the touch strength level corresponding to the touch strength in the mapping table between touch strength and touch strength levels, and updating the touch strength level of the touch region of the page, by the client device.

In the above technical solutions, the method further includes: finding page-turning times corresponding to the touch strength level in a comparison table between touch strength levels and page-turning times after finding the touch strength level corresponding to the touch strength in the mapping table between touch strength and touch strength levels, adding the page-turning times corresponding to the touch strength level to the page-turning times of a current page or to the page-turning times generated through a current touch region, finding the page new-old index corresponding to the page-turning times in the mapping table between page-turning times and page new-old indexes, and updating the new-old index of the page or the touch region.

A client device is provided in the present disclosure and includes: a page presentation module configured to acquire a page new-old parameter of a page to be presented and present the page based on the page new-old parameter; an operation collection module configured to collect operation information of the page; and a data updating module configured to update the page new-old parameter of the page based on the operation information.

In the above technical solutions, the page new-old parameter includes a page new-old index, and/or a touch direction index, and/or a touch strength level.

In the above technical solutions, the page presentation module is configured to: read page data, the page data including page-turning record information and the page-turning record information including a page number, and the page new-old parameter corresponding to the page number; search the page new-old parameter corresponding to the page number of the page to be presented in the page-turning record information based on the page number of the page to be presented; and call or superimpose a background image corresponding to the page new-old parameter via the page new-old parameters, so as to present the page.

In the above technical solutions, the page new-old parameter is a new-old parameter of the entirety of the page, or a new-old parameter of each of N regions divided from the page.

In the above technical solutions, the client device further includes an information storage module configured to save a mapping table between page-turning times and page new-old indexes, and/or a mapping table between sliding directions and touch direction indexes, and/or a mapping table between touch strength and touch strength levels.

In the above technical solutions, the data updating module is configured to: based on a page-turning operation of a user on the page collected by the operation collection module, calculate page-turning times of the page, find the page new-old index corresponding to the page-turning times of the page in a mapping table between page-turning times and page new-old indexes, and update the page new-old index of the page; or based on the page-turning operation and a touch region of the user on the page by the client device, calculate page-turning times generated through the touch region, find the page new-old index corresponding to the page-turning times generated through the touch region in the mapping table between page-turning times and page new-old indexes, and update the new-old index of the touch region of the page; or, based on a sliding direction of the page-turning operation of the user on the page collected by the operation collection module, find the touch direction index corresponding to the sliding direction in a mapping table between sliding directions and touch direction indexes, and update the touch direction index of the page; or, based on the sliding direction and the touch region of the page-turning operation of the user on the page collected by the operation collection module, find the touch direction index corresponding to the sliding direction in the mapping table between sliding directions and touch direction indexes, and update the touch direction index of the touch region of the page; or, based on touch strength of the page-turning operation of the user on the page collected by the operation collection module, find the touch strength level corresponding to the touch strength in a mapping table between touch strength and touch strength levels, and update the touch strength level of the page; or, based on the touch strength and the touch region of the page-turning operation of the user on the page collected by the operation collection module, find the touch strength level corresponding to the touch strength in the mapping table between touch strength and touch strength levels, and update the touch strength level of the touch region of the page; or, based on the page-turning operation and the sliding direction of the user on the page collected by the operation collection module, calculate the page-turning times of the page, find the page new-old index corresponding to the page-turning times of the page in the mapping table between page-turning times and page new-old indexes, and update the page new-old index of the page: and find the touch direction index corresponding to the sliding direction in the mapping table between sliding directions and touch direction indexes, and update the touch direction index of the page: or, based on the page-turning operation, the sliding direction and the touch region of the user on the page collected by the operation collection module, calculate the page-turning times generated through the touch region, find the page new-old index corresponding to the page-turning times generated through the touch region in the mapping table between page-turning times and page new-old indexes, and update the new-old index of the touch region of the page; and find the touch direction index corresponding to the sliding direction in the mapping table between sliding directions and touch direction indexes, and update the touch direction index of the touch region of the page; or, based on the page-turning operation and the touch strength of the user on the page collected by the operation collection module, calculate the page-turning times of the page, find the page new-old index corresponding to the page-turning times in the mapping table between page-turning times and page new-old indexes, and update the page new-old index of the page; and find the touch strength level corresponding to the touch strength in the mapping table between touch strength and touch strength levels, and update the touch strength level of the page; or, based on the page-turning operation, the touch strength and the touch region of the user on the page collected by the operation collection module, calculate the page-turning times generated through the touch region, find the page new-old index corresponding to the page-turning times in the mapping table between page-turning times and page new-old indexes, and update the new-old index of the touch region of the page; and find the touch strength level corresponding to the touch strength in the mapping table between touch strength and touch strength levels, and update the touch strength level of the touch region of the page; or, based on the sliding direction and the touch strength of the page-turning operation of the user on the page collected by the operation collection module, find the touch direction index corresponding to the sliding direction in the mapping table between sliding directions and touch direction indexes, and update the touch direction index of the page; find the touch strength level corresponding to the touch strength in the mapping table between touch strength and touch strength levels, and update the touch strength level of the page; or, based on the sliding direction, the touch strength and the touch region of the page-turning operation of the user on the page collected by the operation collection module, find the touch direction index corresponding to the sliding direction in the mapping table between sliding directions and touch direction indexes, and update the touch direction index of the touch region of the page; and find the touch strength level corresponding to the touch strength in the mapping table between touch strength and touch strength levels, and update the touch strength level of the touch region of the page; or, based on the page-turning operation, the sliding direction and the touch strength of the user on the page collected by the operation collection module, calculate the page-turning times of the page, find the page new-old index corresponding to the page-turning times in the mapping table between page-turning times and page new-old indexes, and update the page new-old index of the page; find the touch direction index corresponding to the sliding direction in the mapping table between sliding directions and touch direction indexes, and update the touch direction index of the page; find the touch strength level corresponding to the touch strength in the mapping table between touch strength and touch strength levels, and update the touch strength level of the page; or, based on the page-turning operation, the sliding direction, the touch strength and the touch region of the user on the page collected by the operation collection module, calculate the page-turning times generated through the touch region, find the page new-old index corresponding to the page-turning times in the mapping table between page-turning times and page new-old indexes, and update the new-old indexes of the touch region of the page; find the touch direction index corresponding to the sliding direction in the mapping table between sliding directions and touch direction indexes, and updating the touch direction index of the touch region of the page; and find the touch strength level corresponding to the touch strength in the mapping table between touch strength and touch strength levels, and update the touch strength level of the touch region of the page.

In the above technical solutions, the data updating module is further configured to: find page-turning times corresponding to the touch strength level in a comparison table between touch strength levels and page-turning times after finding the touch strength level corresponding to the touch strength in the mapping table between touch strength and touch strength levels; add the page-turning times corresponding to the touch strength level to the page-turning times of a current page or to the page-turning times generated through a current touch region; find the page new-old index corresponding to the page-turning times in the mapping table between page-turning times and page new-old indexes; and update the new-old index of the page or the touch region.

An apparatus is further provided in the present disclosure, and includes the above client device.

(III) Beneficial Effects

The embodiments of the present disclosure have the following beneficial effects at least:

The method and the apparatus for differentially presenting a page are provided in the present disclosure, which acquire the page new-old parameter of the page to be presented, present the page based on the page new-old parameter, collect the operation information of the page, and update the page new-old parameter based on the operation information. In this manner, different levels of simulated antiquating effects are presented according to times that the user accesses the page; i.e., interaction feedback between the user and the apparatus may be obtained without keeping body contact all the time, so that the user experience is improved.

BRIEF DESCRIPTION OF THE DRAWINGS

In order to illustrate technical solutions of the present disclosure or in relevant art more clearly drawings used in description of embodiments of the present or the relevant art will be introduced briefly hereinafter. It is apparent that the introduced drawings hereinafter merely relate to some embodiments of the present disclosure, and a person skilled in the art may obtain other drawings without any creative effort based on these drawings. In the drawings (which are not necessarily drawn in scale), similar reference numerals may represent similar parts throughout the drawings. Similar reference numerals with different letter suffixes may represent different examples of similar parts. The drawings generally illustrate various embodiments discussed herein in an exemplary manner, rather than in a limitation manner.

DETAILED DESCRIPTION OF THE EMBODIMENTS

The detailed descriptions of the present disclosure will be further made in detail in conjunction with the drawings and the embodiments. The following embodiments are merely used to illustrate the present disclosure, rather than used to limit the scope of the present disclosure.

In order to make objectives, technical solutions and advantages of the embodiments of the present disclosure more clear, the technical solutions of the embodiments of the present disclosure will be described hereinafter in a clear and complete manner in conjunction with the drawings. Obviously, the embodiments described are merely a part of, rather than all of, the embodiments of the present disclosure. Based on the described embodiments of the present disclosure, all of other embodiments obtained by a person of ordinary skills in the art shall fall within the protection scope of the present disclosure.

Unless defined otherwise, any technical term or scientific term used herein shall have a common meaning understood by a person of ordinary skills in the art to which the present disclosure belongs. Such words as "first" and "second" and similar words used in the specification and claims of the present disclosure are merely used to differentiate different components, rather than to represent any order, number or importance. Similarly, such words as "one" or "a" are merely used to represent existence of at least one member, rather than to limit the number thereof. Such words as "connect" or "connected" are not limited to physical connection or mechanical connection, but may include electrical connection, whether direct connection or indirect connection. Such words as "on", "under", "left" and "right" are merely used to represent relative positional relationship, and when an absolute position of an object described is changed, the relative positional relationship is changed accordingly.

The principles and features of the embodiments of the present disclosure will be described hereinafter in conjunction with the drawings, examples provided herein are only used to illustrate the embodiments of the present disclosure and are not intended to limit the scope of the embodiments of the present disclosure.

In the embodiments of the present disclosure, a client device acquires page new-old parameters of a page to be presented when presenting the page, presents the page based on the page new-old parameters, collects operation information of the page, and updates the page new-old parameters based on the operation information.

The present disclosure will be further described hereinafter in detail through the drawings and specific embodiments.

Figure 1:
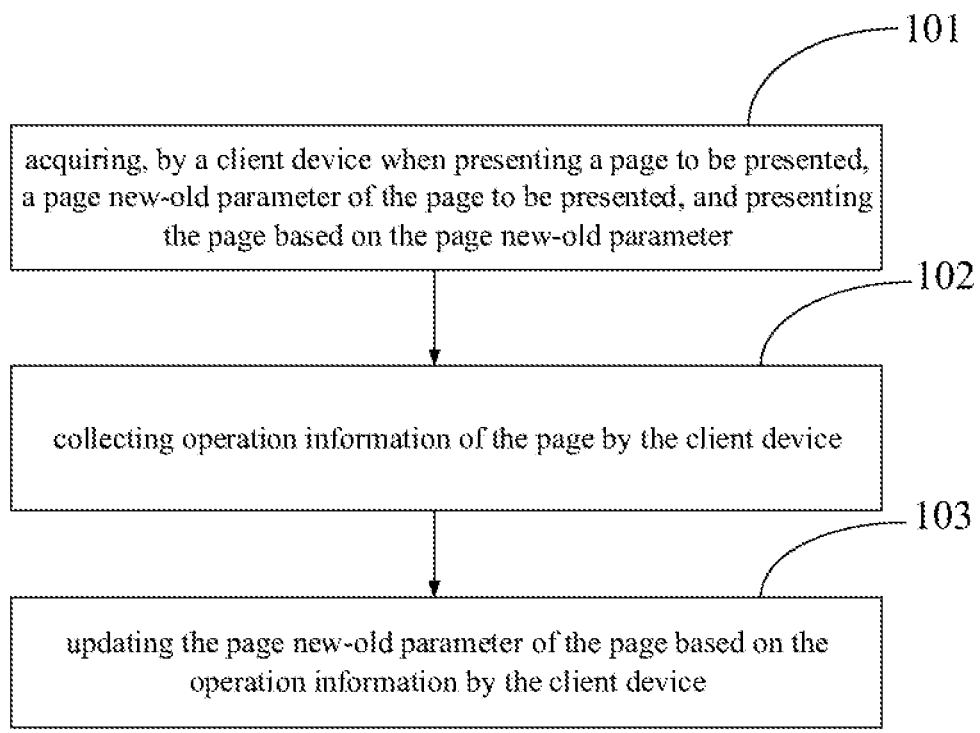
FIG. 1 is a schematic flow diagram of a method for differentially presenting a page provided by embodiments of the present disclosure.

A method for differentially presenting a page is implemented by the embodiments of the present disclosure. As shown in FIG. 1, the method includes the following steps 101 to 103.

Step 101: acquiring, by a client device when presenting a page to be presented, a page new-old parameter of the page to be presented, and presenting the page based on the page new-old parameter.

Specifically, the client device acquires a timestamp of page data on a server, and compares the timestamp with a timestamp of the page data saved locally. If the timestamp on the server is more recent, the page data on the server is synchronized to the client device to read the page data:

otherwise, if the timestamp saved locally is more recent, the client device directly reads the page data saved locally, and a format of the page data on the server is substantially the same as that of the page data saved locally. The page data read by the client device further includes page-turning record information besides the timestamp. The page-turning record information includes page numbers and page new-old parameters corresponding to the page numbers. The page new-old parameters include page new-old indexes, and/or touch direction indexes, and/or touch strength levels. The page data read by the client device further includes: reading offsets, bookmarks, notes, contents, booklists, prices, and other information. The client device searches, in the page-turning record information, the page new-old parameter corresponding to the page number of the page to be presented, and calls or overlaps a background image corresponding to the page new-old parameter to present the page. Different page new-old parameters herein correspond to different or identical background images.

The page new-old parameter is a new-old parameter of the entirety of the page, or a new-old parameter of each of N regions divided from the page.

For instance, the page new-old index is the new-old index of the entirety of the page, or the new-old index of each of N regions divided from the page; the touch direction index is the touch direction index of the entirety of the page, or the touch direction index of each of N regions divided from the page: the touch strength level is the touch strength level of the entirety of the page, or the touch strength level of each of N regions divided from the page. The N regions herein may be N rectangular grids, and N is a natural number.

In an example that the page is divided into N rectangular grids, the page new-old indexes and the touch direction indexes may be recorded as Table 1:

TABLE 1

| Page number | New-old index of the entirety of the page | New-old index of grid 1 of the page | Touch direction index of grid 1 of the page | New-old index of grid 2 of the page | Touch direction index of grid 2 of the page | New-old index of grid n of the page | Touch direction index of grid n of the page |
|---|---|---|---|---|---|---|---|
| 1 | | | | | | | |
| 2 | | | | | | | |
| 3 | | | | | | | |
| 4 | | | | | | | |
| N | | | | | | | |

When presenting the page based on the touch direction index, the most recent M touch direction indexes of each grid may be superimposed to perform a combined presentation.

A mapping table between page-turning times and page new-old indexes, and/or a mapping table between sliding directions and touch direction indexes, and/or a mapping table between touch strength and touch strength levels are saved in the client device, too.

An example of the mapping table between page-turning times and page new-old indexes is shown in Table 2:

TABLE 2

| Page-turning times | New-old page indexes |
|---|---|
| 0 | 0 (most recent-unused) |
| 1 | 1 |
| 2 | 2 |
| 3-4 | 3 |
| 5 | 4 |
| 6-7 | 5 |
| 8 | 6 |
| 9 | 7 |
| 10 | 8 |
| >10 | 9 (least recent) |

The page-turning times=turning times of a single page or touch times of various regions used for a page-turning operation; or the page-turning times=the turning times of a single page or touch times of various regions used for the page-turning operation+rounding [accumulative page-turning times of a document to which the page belongs/a weighting coefficient], wherein the weighting coefficient=a number obtaining by removing a unit digit from the number of pages of the document to which the page belongs; for instance, one book includes 453 pages in total, and the weighting coefficient is 45 after the unit digit 3 is removed.

Step 102: collecting operation information of the page by the client device.

Specifically, one situation is that the page is not divided into N regions, and the client device collects, through a display screen, a page-turning operation of the user on the page, and/or the sliding direction of the page-turning operation, and/or touch strength of the page-turning operation.

Another situation is that the page is divided into N regions, and the client device collects the page-turning operation and a touch region of the user on the page; or, the client device collects the sliding direction and the touch region of the page-turning operation of the user on the page; or, the client device collects the touch strength and the touch region of the page-turning operation of the user on the page; or, the client device collects the page-turning operation, the sliding direction and the touch region of the user on the page; or, the client device collects the page-turning operation, the touch strength and the touch region of the user on the page; or, the client device collects the sliding direction, the touch strength and the touch region of the page-turning operation of the user on the page; or, the client device collects the page-turning operation, the sliding direction, the touch strength and the touch region of the user on the page.

Step 103: updating the page new-old parameter of the page based on the operation information by the client device.

Specifically, the client device collects the page-turning operation of the user on the page, calculates the page-turning times of the page, finds a page new-old index corresponding to the page-turning times in the mapping table between page-turning times and page new-old indexes, and updates the page new-old index of the page; or, the client device collects the page-turning operation and a touch region of the user on the page, calculates page-turning times generated through the touch region, finds a page new-old index corresponding to the touch region in the mapping table between page-turning times and page new-old indexes, and updates the new-old index of the touch region of the page.

Optionally, the client device collects the sliding direction of the page-turning operation of the user on the page, finds the touch direction index corresponding to the sliding direction in the mapping table between sliding directions and touch direction indexes, and updates the touch direction index of the page; or, the client device collects the sliding direction and the touch region of the page-turning operation of the user on the page, finds the touch direction index corresponding to the sliding direction in the mapping table between sliding directions and touch direction indexes, and updates the touch direction index of the touch region of the page.

Optionally, the client device collects a touch strength of the page-turning operation of the user on the page, finds the touch strength level corresponding to the touch strength in the mapping table between touch strength and touch strength levels, and updates the touch strength level of the page; or, the client device collects the touch strength and the touch region of the page-turning operation of the user on the page, finds the touch strength level corresponding to the touch strength in the mapping table between touch strength and touch strength levels, and updates the touch strength level of the touch region of the page.

Optionally, the client device collects the page-turning operation and the sliding direction of the user on the page, calculates the page-turning times of the page, finds a page new-old index corresponding to the page-turning times in the mapping table between page-turning times and page new-old indexes, and updates the page new-old index of the page; and finds the touch direction index corresponding to the sliding direction in the mapping table between sliding directions and touch direction indexes, and updates the touch direction index of the page; or, the client device collects the page-turning operation, the sliding direction and the touch region of the user on the page, calculates the page-turning times generated through the touch region, finds the page new-old index corresponding to the page-turning times in the mapping table between page-turning times and page new-old indexes, and updates the new-old index of the touch region of the page; and finds the touch direction index corresponding to the sliding direction in the mapping table between sliding directions and touch direction indexes, and updates the touch direction index of the touch region of the page.

Optionally, the client device collects the page-turning operation and the touch strength of the user on the page, calculates the page-turning times of the page, finds the page new-old index corresponding to the page-turning times in the mapping table between page-turning times and page new-old indexes, and updates the page new-old index of the page; finds the touch strength level corresponding to the touch strength in the mapping table between touch strength and touch strength levels, and updates the touch strength level of the page; or, the client device collects the page-turning operation, the touch strength and the touch region of the user on the page, calculates the page-turning times generated through the touch region, finds the page new-old index corresponding to the page-turning times in the mapping table between page-turning times and page new-old indexes, and updates the new-old index of the touch region of the page; finds the touch strength level corresponding to the touch strength in the mapping table between touch strength and touch strength levels, and updates the touch strength level of the touch region of the page.

Optionally, the client device collects the sliding direction and the touch strength of the page-turning operation of the user on the page, finds the touch direction index corresponding to the sliding direction in the mapping table between sliding directions and touch direction indexes, and updates the touch direction index of the page; finds the touch strength level corresponding to the touch strength in the mapping table between touch strength and touch strength levels, and updates the touch strength level of the page; or, the client device collects the sliding direction, the touch strength and the touch region of the page-turning operation of the user on the page, finds the touch direction index corresponding to the sliding direction in the mapping table between sliding directions and touch direction indexes, and updates the touch direction index of the touch region of the page; finds the touch strength level corresponding to the touch strength in the mapping table between touch strength and touch strength levels, and updates the touch strength level of the touch region of the page.

Optionally, the client device collects the page-turning operation, the sliding direction and the touch strength of the user on the page, calculates the page-turning times of the page, finds the page new-old index corresponding to the page-turning times in the mapping table between page-turning times and page new-old indexes, and updates the page new-old indexes of the page; finds the touch direction index corresponding to the sliding direction in the mapping table between sliding directions and touch direction indexes, and updates the touch direction index of the page; finds the touch strength level corresponding to the touch strength in the mapping table between touch strength and touch strength levels, and updates the touch strength level of the page; or, the client device collects the page-turning operation, the sliding direction, the touch strength and the touch region of the user on the page, calculates the page-turning times generated through the touch region, finds the page new-old index corresponding to the page-turning times in the mapping table between page-turning times and page new-old indexes, and updates the new-old index of the touch region of the page; finds the touch direction index corresponding to the sliding direction in the mapping table between sliding directions and touch direction indexes, and updates the touch direction index of the touch region of the page; finds the touch strength level corresponding to the touch strength in the mapping table between touch strength and touch strength levels, and updates the touch strength level of the touch region of the page.

In the above-mentioned situations, when calculating the page-turning times of the page, a single page-turning operation conducted for a current page may be generally added into the turning times of the current page, or simultaneously added into the cumulative page-turning times of the document to which the current page belongs. The page-turning times are obtained based on the added turning times of the current page, or based on the added turning times of the current page and the cumulative page-turning times of the document to which the page belongs.

When calculating the page-turning times generated through the touch region, a single page-turning operation generated through touching the touch region may be generally added into touch times of one of regions divided from the current page corresponding to the touch region, or simultaneously added into the cumulative page-turning times of the document to which the page belongs. The page-turning times are obtained based on the added touch times of the one of the region divided from the current page corresponding to the touch region, or based on the added touch times of the one of the regions divided from the current page corresponding to the touch region and the cumulative page-turning times of the document to which the page belongs.

Moreover, in the embodiments of the present disclosure, besides directly calling corresponding background images through the touch strength level, the touch strength level may also be transformed into the page-turning times, so as to update the page new-old index and implement directly calling corresponding background images through the page new-old index. In this way, the above-mentioned method may further include: finding the page-turning times corresponding to the touch strength level in a comparison table between touch strength levels and page-turning times after finding the touch strength level corresponding to the touch strength in the mapping table between touch strength and touch strength levels; adding the page-turning times corresponding to the touch strength level to the page-turning times of the current page or to the page-turning times generated through the current touch region, finding the page new-old index corresponding to the page-turning times in the mapping table between page-turning times and page new-old indexes, and updating the new-old index of the page or the touch region.

The comparison table between touch strength levels and page-turning times may be shown in Table 3. For example, the touch strength level corresponding to the collected touch strength is 2, and the page-turning times corresponding to the touch strength level are 2 by searching the table.

TABLE 3

| Touch strength level | Turning times |
| --- | --- |
| 3 (maximum) | 3 times |
| 2 | Twice |
| 1 (minimum) | Once |

Figure 2:
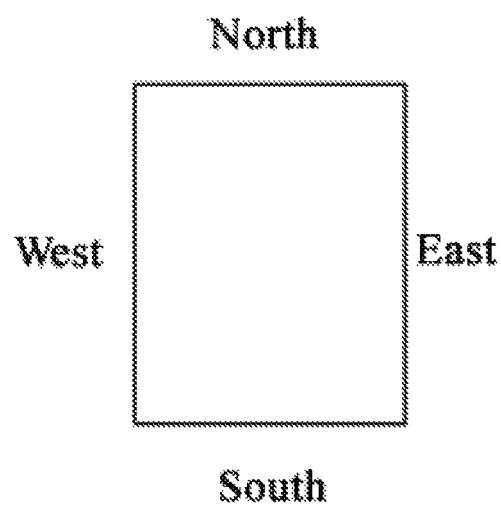
FIG. 2 is a schematic diagram of four orientations on a display screen provided by the embodiments of the present disclosure.

The mapping table between sliding directions and touch direction indexes may be shown in Table 4, wherein the east, the south, the west and the north correspond to four positions on a display screen. As shown in FIG. 2, the north is on top of the display screen, the south is at the bottom of the display screen, the west lies on the left of the display screen, and the east lies on the right of the display screen.

TABLE 4

| Touch direction Index mark | Sliding direction |
| --- | --- |
| 1 | north –> south |
| 2 | south –> north |
| 3 | east –> west |
| 4 | west –> east |
| 5 | northeast –> southwest |
| 6 | southwest –> northeast |
| 7 | southeast –> northwest |
| 8 | northwest –> southeast |

The embodiment further includes: when presenting the page next time, presenting the page based on the updated page new-old parameters.

A specific manner of this step is the same as the implementation of step 101, and will not be elaborated herein.

The method further includes: after an exit instruction or an instruction of exiting the document to which the current page belongs is received, or after no operation is conducted by the user within a predetermined time, the client device saves the page data related to the document including the current page-turning record information locally, and/or synchronize the page data to a server.

The document in the above embodiments may be a book, a gazette, a magazine, or the like.

Figure 3:
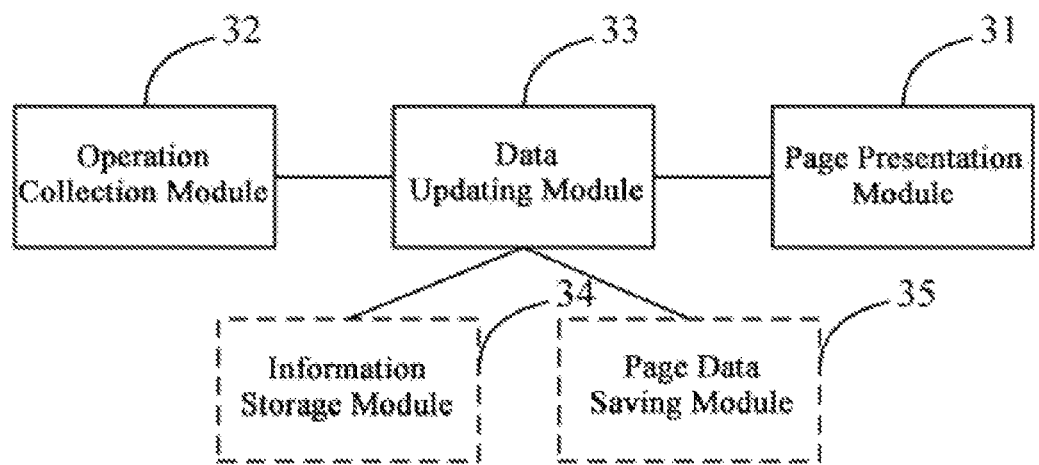
FIG. 3 is a structural schematic diagram of a client device provided by the embodiments of the present disclosure.

In order to implement the above-mentioned method, a client device is further provided in the present disclosure. As shown in FIG. 3, the client device includes a page presentation module 31, an operation collection module 32 and a data updating module 33.

The page presentation module 31 is configured to acquire a page new-old parameter of a page to be presented and present the page based on the page new-old parameter. The operation collection module 32 is configured to collect operation information of the page. The data updating module 33 is configured to update the page new-old parameter of the page based on the operation information.

The page presentation module 31 is further configured to, when presenting the page next time, present the page based on the updated page new-old parameter.

Specifically, the page presentation module 31 is configured to acquire a timestamp of page data on a server, and compare the timestamp with a timestamp of the page data saved locally. If the timestamp on the server is more recent, the page data on the server is synchronized to the client device to read the page data. If the timestamp of the page data saved locally is more recent, the page data saved locally is read directly. The read page data includes, besides the timestamp, page-turning record information. The page-turning record information includes: page numbers, and page new-old parameters corresponding to the page numbers. The page new-old parameters include page new-old indexes, and/or touch direction indexes, and/or touch strength levels. The page new-old parameter corresponding to the page number of the page to be presented is searched in the page-turning record information based on the page number, and a background image is called or superimposed via the page new-old parameters to present the page. Different page new-old parameters herein correspond to different or identical background images. The read page data further includes: reading offsets, bookmarks, notes, contents, booklists, prices, and the like.

The page new-old parameter is a new-old parameter of the entirety of the page, or a new-old parameter of each of N regions divided from the page.

For instance, the page new-old index is the new-old index of the entirety of the page, or the new-old index of each of N regions divided from the page. The touch direction index is the touch direction index of the entirety of the page, or the touch direction index of each of N regions divided from the page. The touch strength level is the touch strength level of the entirety of the page, or the touch strength level of each of N regions divided from the page. The N regions herein may be N rectangular grids, and N is a natural number.

The client device further includes: an information storage module 34 configured to save a mapping table between page-turning times and page new-old indexes, and/or a mapping table between sliding directions and touch direction indexes, and/or a mapping table between touch strength and touch strength levels.

The page-turning times=turning times of a single page or touch times of various regions used for a page-turning operation, or the page-turning times=the turning times of a single page or touch times of various regions used for the page-turning operation+rounding [accumulative page-turning times of a document to which the page belongs/a weighting coefficient], wherein the weighting coefficient=a number obtaining by removing a unit digit from the number of pages of the document to which the page belongs. For instance, one book includes 453 pages in total, and the weighting coefficient is 45 after the unit digit 3 is removed.

The operation collection module 32 is specifically configured to collect, through a display screen, a page-turning operation of a user on the page, and/or a sliding direction of the page-turning operation, and/or touch strength of the page-turning operation, in case that the page is not divided into N regions.

The operation collection module 32 is further configured to: in case that the page is divided into N regions, collect the page-turning operation and a touch region of the user on the page, or collect the sliding direction and the touch region of the page-turning operation of the user on the page, or collect the touch strength and the touch region of the page-turning operation of the user on the page, or collect the page-turning operation, the sliding direction and the touch region of the user on the page, or collect the page-turning operation, the touch strength and the touch region of the user on the page, or collect the sliding direction, the touch strength and the touch region of the page-turning operation of the user on the page, or collect the page-turning operation, the sliding direction, the touch strength and the touch region of the user on the page.

The data updating module 33 is specifically configured to: based on the page-turning operation of the user on the page collected by the operation collection module 32, calculate the page-turning times of the page, finds a page new-old index corresponding to the page-turning times in the mapping table between page-turning times and page new-old indexes, and update the page new-old index of the page; or based on the page-turning operation and the touch region of the user on the page collected by the operation collection module 32, calculate the page-turning times generated through the touch region, find a new-old index corresponding to the touch region in the mapping table between page-turning times and page new-old indexes, and update the new-old index of the touch region of the page.

Optionally, the data updating module 33 is specifically configured to: based on the sliding direction of the page-turning operation of the user on the page collected by the operation collection module 32, find a touch direction index corresponding to the sliding direction in the mapping table between sliding directions and touch direction indexes, and update the touch direction index of the page; or based on the sliding direction and the touch region of the page-turning operation of the user on the page collected by the operation collection module 2, find the touch direction index corresponding to the sliding direction in the mapping table between sliding directions and touch direction indexes, and update the touch direction index of the touch region of the page.

Optionally, the data updating module 33 is specifically configured to: based on the touch strength of the page-turning operation of the user on the page collected by the operation collection module 32, find a touch strength level corresponding to the touch strength in the mapping table between touch strength and touch strength levels, and update the touch strength level of the page; or based on the touch strength and the touch region of the page-turning operation of the user on the page collected by the operation collection module 32, find the touch strength level corresponding to the touch strength in the mapping table between touch strength and touch strength levels, and update the touch strength level of the touch region of the page.

Optionally, the data updating module 33 is specifically configured to: based on the page-turning operation and the sliding direction of the user on the page collected by the operation collection module 32, calculate the page-turning times of the page, find a page new-old index corresponding to the page-turning times in the mapping table between page-turning times and page new-old indexes, and update the page new-old index of the page; and find the touch direction index corresponding to the sliding direction in the mapping table between sliding directions and touch direction indexes, and update the touch direction index of the page: or, based on the page-turning operation, the sliding direction and the touch region of the user on the page collected by the operation collection module 32, calculate the page-turning times generated through the touch region, find the page new-old index corresponding to the page-turning times in the mapping table between page-turning times and page new-old indexes, and update the new-old index of the touch region of the page: and find the touch direction index corresponding to the sliding direction in the mapping table between sliding directions and touch direction indexes, and update the touch direction index of the touch region of the page.

Optionally, the data updating module 33 is specifically configured to: based on the page-turning operation and the touch strength of the user on the page collected by the operation collection module 32, calculate the page-turning times of the page, find the page new-old index corresponding to the page-turning times in the mapping table between page-turning times and page new-old indexes, and update the page new-old index of the page; find the touch strength level corresponding to the touch strength in the mapping table between touch strength and touch strength levels, and update the touch strength level of the page; or, based on the page-turning operation, the touch strength and the touch region of the user on the page collected by the operation collection module 32, calculate the page-turning times generated through the touch region, find the page new-old index corresponding to the page-turning times in the mapping table between page-turning times and page new-old indexes, and update the new-old index of the touch region of the page: find the touch strength level corresponding to the touch strength in the mapping table between touch strength and touch strength levels, and update the touch strength level of the touch region of the page.

Optionally, the data updating module 33 is specifically configured to: based on the sliding direction and the touch strength of the page-turning operation of the user on the page collected by the operation collection module 32, find the touch direction index corresponding to the sliding direction in the mapping table between sliding directions and touch direction indexes, and update the touch direction index of the page; and find the touch strength level corresponding to the touch strength in the mapping table between touch strength and touch strength levels, and update the touch strength level of the page: or based on the sliding direction, the touch strength and the touch region of the page-turning operation of the user on the page collected by the operation collection module 32, find the touch direction index corresponding to the sliding direction in the mapping table between sliding directions and touch direction indexes, and update the touch direction index of the touch region of the page; and find the touch strength level corresponding to the touch strength in the mapping table between touch strength and touch strength levels, and update the touch strength level of the touch region of the page.

Optionally, the data updating module 33 is specifically configured to: based on the page-turning operation, the sliding direction and the touch strength of the user on the page collected by the operation collection module 32, calculate the page-turning times of the page, find the page new-old index corresponding to the page-turning times in the mapping table between page-turning times and page new-old indexes, and update the page new-old indexes of the page; and find the touch direction index corresponding to the sliding direction in the mapping table between sliding directions and touch direction indexes, and update the touch direction index of the page; and find the touch strength level corresponding to the touch strength in the mapping table between touch strength and touch strength levels, and update the touch strength level of the page; or, based on the page-turning operation, the sliding direction, the touch strength and the touch region of the user on the page collected by the operation collection module 32, calculate the page-turning times generated through the touch region, find the page new-old index corresponding to the page-turning times in the mapping table between page-turning times and page new-old indexes, and update the new-old index of the touch region of the page; and find the touch direction index corresponding to the sliding direction in the mapping table between sliding directions and touch direction indexes, and update the touch direction index of the touch region of the page; and find the touch strength level corresponding to the touch strength in the mapping table between touch strength and touch strength levels, and update the touch strength level of the touch region of the page.

The data updating module 33 is further configured to: find the page-turning times corresponding to the touch strength level in a comparison table between touch strength levels and page-turning times after finding the touch strength level corresponding to the touch strength in the mapping table between touch strength and touch strength levels; add the page-turning times corresponding to the touch strength level to page-turning times of the current page or to the page-turning times generated through the current touch region, find the page new-old index corresponding to the page-turning times in the mapping table between page-turning times and page new-old indexes, and update the page new-old index of the page or the new-old index of the touch region. Accordingly, the information storage module 34 is further configured to save the comparison table between the touch strength level and the page-turning times.

The client device further includes: a page data saving module 35 configured to: after an exit instruction or an instruction of exiting the document to which the page belongs is received, or after no operation is conducted by the user within a predetermined time, save the page data related to the document including the current page-turning record information locally, and/or synchronize the page data to a server.

Based on the above-mentioned client device, an apparatus on which the above-mentioned client device is installed is provided in the embodiments of the present disclosure. The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

The method for differentially presenting a page provided in the embodiments of the present disclosure may also be stored in a computer-readable storage medium if being implemented in a form of software modules and sold or used as an independent product. Based on such understanding, the essence of the technical solutions of the embodiments of the present disclosure, or a part of the technical solutions contributing to the relevant art, may be embodied in form of a software product which is stored in a storage medium including a number of instructions used to cause a computer device (which may be a personal computer, a server, or a network device, etc.) to perform all or a part of the method described in each of the embodiments of the present disclosure. The fore-mentioned storage medium includes any medium that is capable of storing program codes such as a USB disk, a mobile hard disk, a Read Only Memory (ROM), a magnetic disk or an optical disk, and the like. In this way, the embodiments of the present disclosure are not limited to any particular combination of hardware and software.

Accordingly, a computer storage medium is further provided in the embodiments of the present disclosure, which stores a computer program for performing the method for differentially presenting a page of the embodiments of the present disclosure.

What is described above is merely optional embodiments of the present disclosure, but is not intended to limit the protection scope of the present disclosure. Any modifications, equivalent substitutions and improvements made within the principles and spirits of the present disclosure shall all fall in the protection scope of the present disclosure.

What is claimed is:

1. A method for page difference presentation, comprising:
acquiring a page new-old parameter of a page to be presented;
presenting the page based on the page new-old parameter; and
collecting operation information of the page, and updating the page new-old parameter based on the operation information,
wherein, the page new-old parameter comprises: a page new-old index and a touch strength level, or comprises a page new-old index, a touch strength level and a touch direction index,
collecting operation information of the page, and updating the page new-old parameter based on the operation information, comprise:
collecting a touch strength of the page-turning operation of the user on the page, finding a touch strength level corresponding to the touch strength in a mapping table between touch strength and touch strength levels, and updating the touch strength level of the page, by the client device; or, collecting the touch strength and a touch region of the page-turning operation of the user on the page, finding the touch strength level corresponding to the touch strength in the mapping table between touch strength and touch strength levels, and updating the touch strength level of the touch region of the page, by the client device;

or, collecting the page-turning operation and the touch strength of the user on the page, calculating the page-turning times of the page, finding the page new-old index corresponding to the page-turning times in the mapping table between page-turning times and page new-old indexes, and updating the page new-old index of the page; and finding the touch strength level corresponding to the touch strength in the mapping table between touch strength and touch strength levels, and updating the touch strength level of the page, by the client device; or, collecting the page-turning operation, the touch strength and a touch region of the user on the page, calculating the page-turning times generated through the touch region, finding the page new-old index corresponding to the page-turning times in the mapping table between page-turning times and page new-old indexes, and updating the new-old index of the touch region of the page; and finding the touch strength level corresponding to the touch strength in the mapping table between touch strength and touch strength levels, and updating the touch strength level of the touch region of the page, by the client device;

or, collecting the sliding direction and the touch strength of the page-turning operation of the user on the page, finding the touch direction index corresponding to the sliding direction in the mapping table between sliding directions and touch direction indexes, and updating the touch direction index of the page; finding the touch strength level corresponding to the touch strength in the mapping table between touch strength and touch strength levels, and updating the touch strength level of the page, by the client device; or, collecting the sliding direction, the touch strength and a touch region of the page-turning operation of the user on the page, finding the touch direction index corresponding to the sliding direction in the mapping table between sliding directions and touch direction indexes, and updating the touch direction index of the touch region of the page; and finding the touch strength level corresponding to the touch strength in the mapping table between touch strength and touch strength levels, and updating the touch strength level of the touch region of the page, by the client device;

or, collecting the page-turning operation, the sliding direction and the touch strength of the user on the page, calculating the page-turning times of the page, finding the page new-old index corresponding to the page-turning times in the mapping table between page-turning times and page new-old indexes, and updating the page new-old index of the page; finding the touch direction index corresponding to the sliding direction in the mapping table between sliding directions and touch direction indexes, and updating the touch direction index of the page; finding the touch strength level corresponding to the touch strength in the mapping table between touch strength and touch strength levels, and updating the touch strength level of the page, by the client device; or, collecting the page-turning operation, the sliding direction, the touch strength and a touch region of the user on the page, calculating the pae-tumin times generated through the touch region, finding the page new-old index corresponding to the page-turning times in the mapping table between page-turning times and page new-old indexes, and updating the new-old indexes of the touch region of the page; finding the touch direction index corresponding to the sliding direction in the mapping table between sliding directions and touch direction indexes, and updating the touch direction index of the touch region of the page; and finding the touch strength level corresponding to the touch strength in the mapping table between touch strength and touch strength levels, and updating the touch strength level of the touch region of the page, by the client device, the method further comprises finding page-turning times corresponding to the touch strength level in a comparison table between touch strength levels and page-turning times after finding the touch strength level corresponding to the touch strength in the mapping table between touch strength and touch strength levels, adding the page-turning times corresponding to the touch strength level to the page-turning times of a current page or to the page-turning times generated through a current touch region, finding the page new-old index corresponding to the page-turning times in the mapping table between page-turning times and page new-old indexes, and updating the new-old index of the page or the touch region.

2. The method according to claim 1, wherein acquiring the page new-old parameter of the page to be presented and presenting the page based on the page new-old parameter comprise:

reading page data by a client device, the page data comprising page-turning record information and the page-turning record information comprising a page number, and the page new-old parameter corresponding to the page number;

searching, by the client device, the page new-old parameter corresponding to the page number of the page to be presented in the page-turning record information by the client device based on the page number of the page to be presented, and calling or superimposing, by the client device, a background image corresponding to the page via the page new-old parameter so as to present the page.

3. The method according to claim 1, wherein the page new-old parameter is a new-old parameter of the entirety of the page, or a new-old parameter of each of N regions divided from the page.

4. A client device, comprising:

a page presentation circuit configured to acquire a page new-old parameter of a page to be presented and present the page based on the page new-old parameter;

an operation collection circuit configured to collect operation information of the page; and a data updating circuit configured to update the page new-old parameter of the page based on the operation information, wherein the page new-old parameter comprises a page new-old index and a touch strength level, or comprises a page new-old index, a touch strength level, and a touch direction index, the data updating circuit is configured to:

based on touch strength of the page-turning operation of the user on the page collected by the operation collection circuit, find the touch strength level corresponding to the touch strength in a mapping table between touch strength and touch strength levels, and update the touch strength level of the page; or, based on the touch strength and a touch region of the page-turning operation of the user on the page collected by the operation collection circuit, find the touch strength level corresponding to the touch strength in the mapping table between touch strength and touch strength levels, and update the touch strength level of the touch region of the page;

or, based on the page-turning operation and the touch strength of the user on the page collected by the operation collection circuit, calculate the page-turning times of the page, find the page new-old index corresponding to the page-turning times in the mapping table between page-turning times and page new-old indexes, and update the page new-old index of the page; and find the touch strength level corresponding to the touch strength in the mapping table between touch strength and touch strength levels, and update the touch strength level of the page; or, based on the page-turning operation, the touch strength and a touch region of the user on the page collected by the operation collection circuit, calculate the page-turning times generated through the touch region, find the page new-old index corresponding to the page-turning times in the mapping table between page-turning times and page new-old indexes, and update the new-old index of the touch region of the page; and find the touch strength level corresponding to the touch strength in the mapping table between touch strength and touch strength levels, and update the touch strength level of the touch region of the page;

or, based on the sliding direction and the touch strength of the page-turning operation of the user on the page collected by the operation collection circuit, find the touch direction index corresponding to the sliding direction in the mapping table between sliding directions and touch direction indexes, and update the touch direction index of the page; find the touch strength level corresponding to the touch strength in the mapping table between touch strength and touch strength levels, and update the touch strength level of the page; or, based on the sliding direction, the touch strength and a touch region of the page-turning operation of the user on the page collected by the operation collection circuit, find the touch direction index corresponding to the sliding direction in the mapping table between sliding directions and touch direction indexes, and update the touch direction index of the touch region of the page; and find the touch strength level corresponding to the touch strength in the mapping table between touch strength and touch strength levels, and update the touch strength level of the touch region of the page;

or, based on the page-turning operation, the sliding direction and the touch strength of the user on the page collected by the operation collection circuit, calculate the page-turning times of the page, find the page new-old index corresponding to the page-turning times in the mapping table between page-turning times and page new-old indexes, and update the page new-old index of the page; find the touch direction index corresponding to the sliding direction in the mapping table between sliding directions and touch direction indexes, and update the touch direction index of the page; find the touch strength level corresponding to the touch strength in the mapping table between touch strength and touch strength levels, and update the touch strength level of the page; or, based on the page-turning operation, the sliding direction, the touch strength and a touch region of the user on the page collected by the operation collection circuit, calculate the page-turning times generated through the touch region, find the page new-old index corresponding to the page-turning times in the mapping table between page-turning times and page new-old indexes, and update the new-old indexes of the touch region of the page; find the touch direction index corresponding to the sliding direction in the mapping table between sliding directions and touch direction indexes, and updating the touch direction index of the touch region of the page; and find the touch strength level corresponding to the touch strength in the mapping table between touch strength and touch strength levels, and update the touch strength level of the touch region of the page, the data updating circuit is further configured to:
 find page-turning times corresponding to the touch strength level in a comparison table between touch strength levels and page-turning times after finding the touch strength level corresponding to the touch strength in the mapping table between touch strength and touch strength levels;
 add the page-turning times corresponding to the touch strength level to the page-turning times of a current page or to the page-turning times generated through a current touch region;
 find the page new-old index corresponding to the page-turning times in the mapping table between page-turning times and page new-old indexes; and
 update the new-old index of the page or the touch region.

5. The client device according to claim 4, wherein the page presentation circuit is configured to:
 read page data, the page data comprising page-turning record information and the page-turning record information comprising a page number, and the page new-old parameter corresponding to the page number;
 search the page new-old parameter corresponding to the page number of the page to be presented in the page-turning record information based on the page number of the page to be presented; and
 call or superimpose a background image corresponding to the page new-old parameter via the page new-old parameters, so as to present the page.

6. The client device according to claim 4, wherein the page new-old parameter is a new-old parameter of the entirety of the page, or a new-old parameter of each of N regions divided from the page.

7. The client device according to claim 4, further comprising:
 an information storage circuit configured to save a mapping table between page-turning times and page new-old indexes, and at least one of a mapping table between sliding directions and touch direction indexes or a mapping table between touch strength and touch strength levels.

8. A client device, comprising:
 a processor;
 a memory configured to store program instructions executable by the processor;
 wherein the processor is configured to read and execute the program instructions stored in the memory so as to perform:
  acquiring a page new-old parameter of a page to be presented;
  presenting the page based on the page new-old parameter; and collecting operation information of the page, and updating the page new-old parameter based on the operation information, wherein the page new-old parameter comprises a page new-old index and a touch strength level, or comprises a page new-old index, a touch strength level, and a touch direction index, collecting operation information of the page and updating the page new-old parameter based on the operation information, comprise:

collecting a touch strength of the page-turning operation of the user on the page, finding a touch strength level corresponding to the touch strength in a mapping table between touch strength and touch strength levels, and updating the touch strength level of the page, by the client device; or, collecting the touch strength and a touch region of the page-turning operation of the user on the page, finding the touch strength level corresponding to the touch strength in the mapping table between touch strength and touch strength levels, and updating the touch strength level of the touch region of the page, by the client device;

or, collecting the page-turning operation and the touch strength of the user on the page, calculating the page-turning times of the page, finding the page new-old index corresponding to the page-turning times in the mapping table between page-turning times and page new-old indexes, and updating the page new-old index of the page; and finding the touch strength level corresponding to the touch strength in the mapping table between touch strength and touch strength levels, and updating the touch strength level of the page, by the client device; or, collecting the page-turning operation, the touch strength and a touch region of the user on the page, calculating the page-turning times generated through the touch region, finding the page new-old index corresponding to the page-turning times in the mapping table between page-turning times and page new-old indexes, and updating the new-old index of the touch region of the page; and finding the touch strength level corresponding to the touch strength in the mapping table between touch strength and touch strength levels, and updating the touch strength level of the touch region of the page, by the client device;

or, collecting the sliding direction and the touch strength of the page-turning operation of the user on the page, finding the touch direction index corresponding to the sliding direction in the mapping table between sliding directions and touch direction indexes, and updating the touch direction index of the page; finding the touch strength level corresponding to the touch strength in the mapping table between touch strength and touch strength levels, and updating the touch strength level of the page, by the client device; or, collecting the sliding direction, the touch strength and a touch region of the page-turning operation of the user on the page, finding the touch direction index corresponding to the sliding direction in the mapping table between sliding directions and touch direction indexes, and updating the touch direction index of the touch region of the page; and finding the touch strength level corresponding to the touch strength in the mapping table between touch strength and touch strength levels, and updating the touch strength level of the touch region of the page, by the client device;

or, collecting the page-turning operation, the sliding direction and the touch strength of the user on the page, calculating the page-turning times of the page, finding the page new-old index corresponding to the page-turning times in the mapping table between page-turning times and page new-old indexes, and updating the page new-old index of the page; finding the touch direction index corresponding to the sliding direction in the mapping table between sliding directions and touch direction indexes, and updating the touch direction index of the page; finding the touch strength level corresponding to the touch strength in the mapping table between touch strength and touch strength levels, and updating the touch strength level of the page, by the client device; or, collecting the page-turning operation, the sliding direction, the touch strength and a touch region of the user on the page, calculating the page-turning times generated through the touch region, finding the page new-old index corresponding to the page-turning times in the mapping table between page-turning times and page new-old indexes, and updating the new-old indexes of the touch region of the page; finding the touch direction index corresponding to the sliding direction in the mapping table between sliding directions and touch direction indexes, and updating the touch direction index of the touch region of the page; and finding the touch strength level corresponding to the touch strength in the mapping table between touch strength and touch strength levels, and updating the touch strength level of the touch region of the page, by the client device, the processor is configured to read and execute the program instructions stored in the memory so as to perform:

finding page-turning times corresponding to the touch strength level in a comparison table between touch strength levels and page-turning times after finding the touch strength level corresponding to the touch strength in the mapping table between touch strength and touch strength levels, adding the page-turning times corresponding to the touch strength level to the page-turning times of a current page or to the page-turning times generated through a current touch region, finding the page new-old index corresponding to the page-turning times in the mapping table between page-turning times and page new-old indexes, and updating the new-old index of the page or the touch region.

* * * * *

UNITED STATES PATENT AND TRADEMARK OFFICE
CERTIFICATE OF CORRECTION

PATENT NO. : 10,649,632 B2
APPLICATION NO. : 15/561319
DATED : May 12, 2020
INVENTOR(S) : Xu Lin et al.

It is certified that error appears in the above-identified patent and that said Letters Patent is hereby corrected as shown below:

On the Title Page

Item "(73) Assignee:" please insert the second Assignee name after the first Assignee name China Mobile Group Zhejiang Co., Ltd., Zhejiang (CN):
-- Migu Digital Media Co., Ltd., Zhejiang (CN) --

Signed and Sealed this
Sixteenth Day of June, 2020

Andrei Iancu
*Director of the United States Patent and Trademark Office*